Dec. 5, 1967  J. J. LAIDIG  3,356,235
SILO UNLOADER AND METHOD
Filed June 30, 1966  2 Sheets-Sheet 1
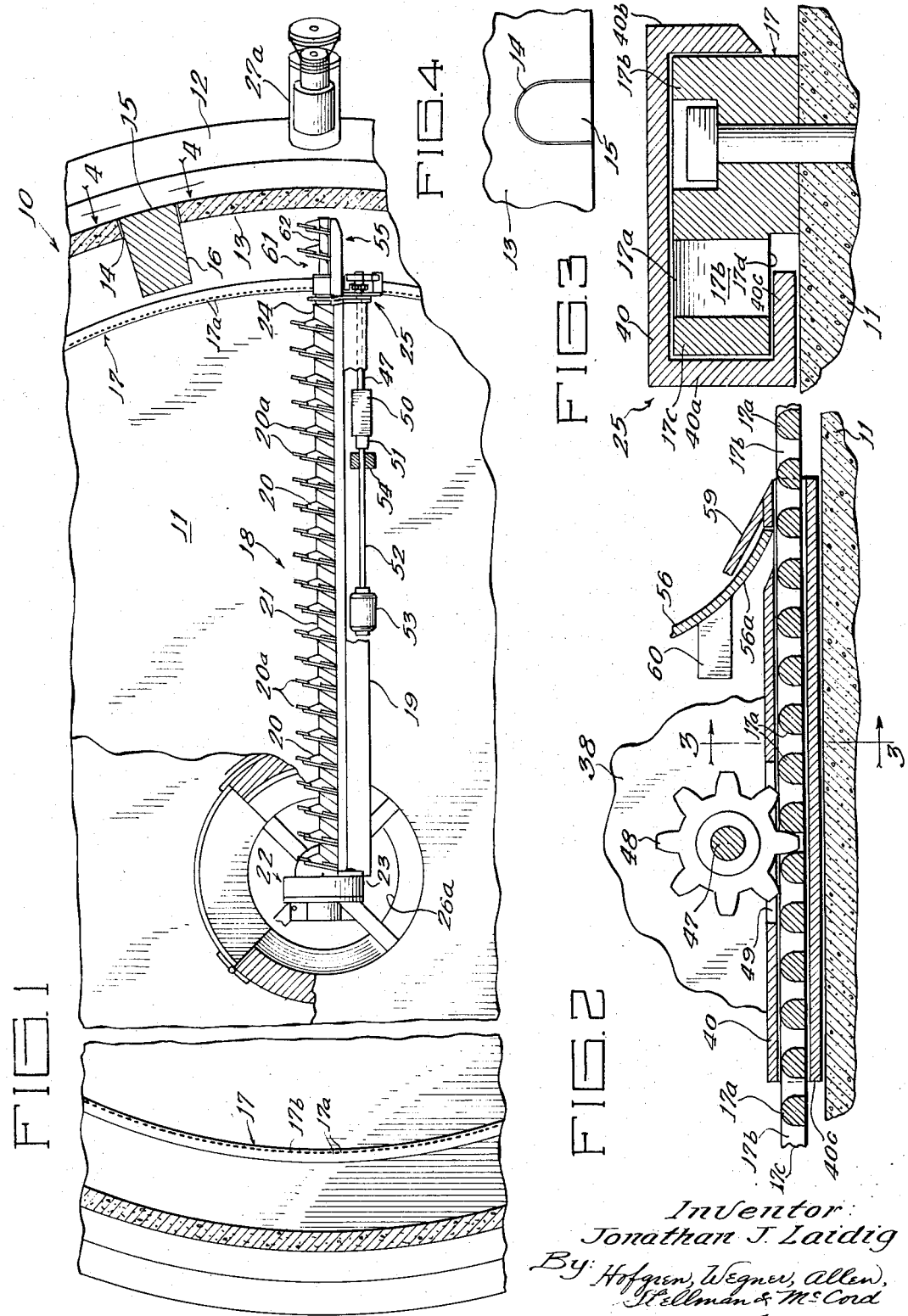
Inventor
Jonathan J. Laidig
By: Hofgren, Wegner, Allen,
Stellman & McCord
Attorneys

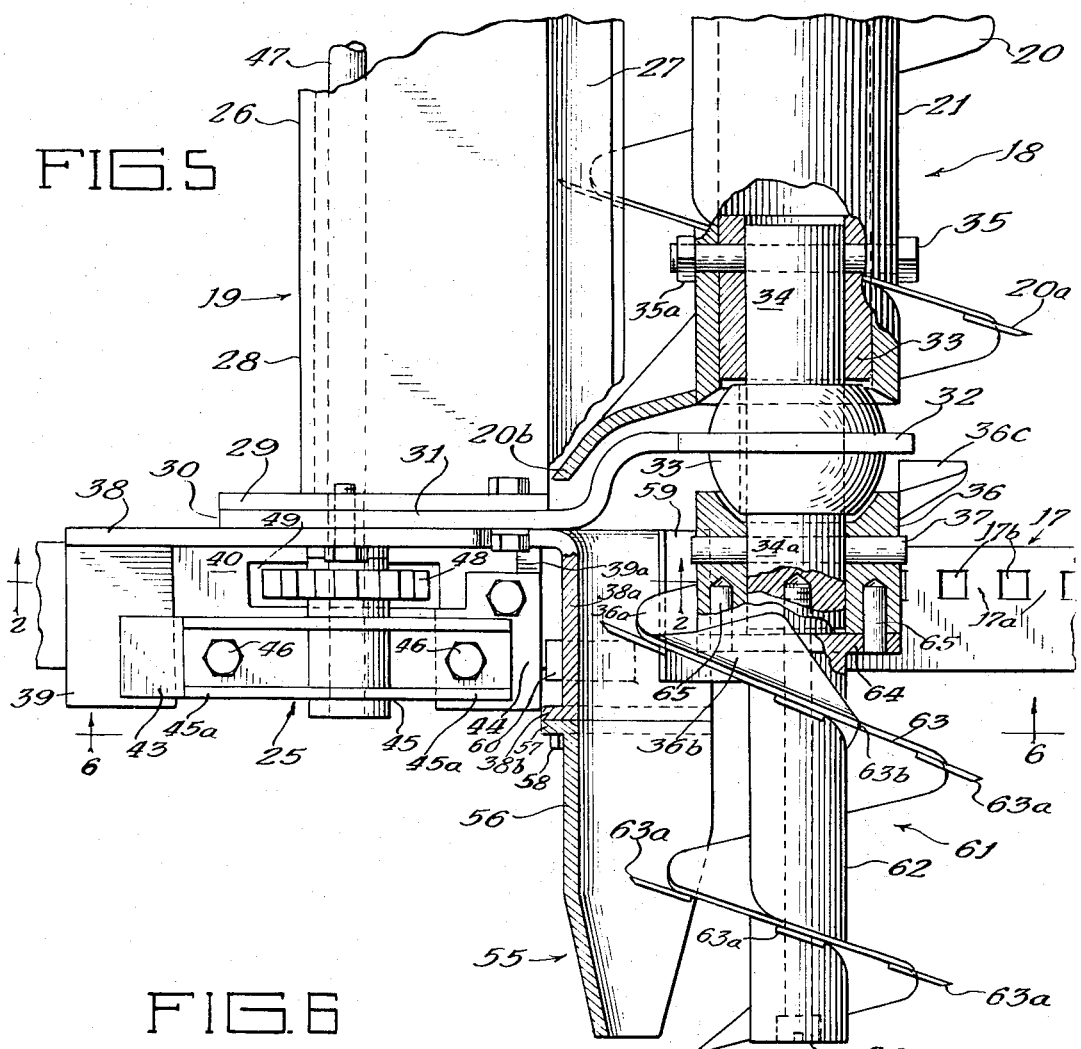

United States Patent Office 3,356,235
Patented Dec. 5, 1967

3,356,235
SILO UNLOADER AND METHOD
Jonathan J. Laidig, Mishawaka, Ind., assignor to Laidig Silo Unloaders, Inc., a corporation of Delaware
Filed June 30, 1966, Ser. No. 561,832
22 Claims. (Cl. 214—17)

ABSTRACT OF THE DISCLOSURE

A bottom silo unloader in which a sweep arm extends from the center to a drive track that is inset from the silo wall, with a sweep auger on the arm that terminates at the track. A drive carriage on the track supports the outer end of the arm and auger, and a removable auger section and a removable shield extend from the track outwardly so that the auxiliary auger may remove material between the wall and the track and move it into the path of the auger. The auxiliary auger may be of smaller diameter than the main auger, and tapered to reduce load and assist in dome formation.

---

Bottom unloaders for silos are theoretically the most desirable because they remove the oldest silage first, and the new silage may be put into the top of the silo before it is completely empty. Furthermore, they remove silage which has not been exposed to air since it was put in the silo, and accordingly spoilage is held to a minimum. Furthermore, silage at the bottom of a silo is less likely to be frozen in winter when silage is most heavily used for animal feeding. However, there are certain difficulties associated with the use of bottom silo unloaders, among which is the way that the silage packs in the silo. Tiedemann Patent 2,635,770 discloses the findings of A. O. Smith Company that the highest density of material in a silo is adjacent the wall. This high density is aggravated by the fact that it is the silage closest to the wall which is most likely to freeze. During the period of nearly 17 years since the application for the Tiedemann patent was filed, considerable work has been done with bottom silo unloaders, and today one of the preferred techniques for unloading is to initially leave a wall of silage about 14" to 16" wide against the silo wall, cutting out only the silage in the central area at first, and to thereafter cut out most of the wall. This mode of operation is evidenced in the A. O. Smith Harvestore and Permaglass Unloader Parts Catalog which was published at least as early as 1963. This Parts Catalog illustrates a cutter arm assembly which has a removable outer end portion, and page 15 of the catalog describes the operations required to shorten the arm to establish a bridge in the silage. Establishment of such a bridge is said to reduce the load on the cutter arm and strain on the cutter and conveyor chains, motor and gears. Starting the unloader in grass, corn, or haylage with an arm that extends completely to the silo wall is stated to be an abuse of the unloader, and the purchaser is instructed to initially use a short sweep arm for two or three revolutions to produce a bridge or dome, and then reassemble the arm at full length to cut into the bridge support.

It is apparent that due to the packing of silage adjacent the silo wall, the silo unloaders which have a drive for the sweep arm adjacent the silo wall, as disclosed in Holmgreen Patent 1,275,558, Laidig 3,121,501 (Reissue 25,863), and Weaver et al. 3,237,788, have their drive tracks and driving mechanism in that part of the silo which contains the densest silage. Accordingly, removal of that portion of the silage by the plow 100 of Laidig or by the end cutter 68 of Weaver et al. requires a very high power output if the entire silo to the wall is to be initially opened at one time. Furthermore, if the track for driving the sweep arm is immediately adjacent the wall it is more difficult to keep the track clean.

In accordance with the present invention, the drive track for the unloader sweep arm is moved about 16" inwardly from the silo wall, and the sweep arm as such has its outer end adjacent the track where it is provided with carriage means which supports the outer end of the sweep arm and also has a drive wheel engaging the drive track. A removable extension member extends from the outer end of the sweep arm to a point close adjacent the silo wall. Primary conveyor auger means on the sweep arm terminates just outside the track, and an auxiliary conveyor auger which is coaxial with the primary auger means and has a shaft forming an extension of the primary auger shaft is removable with the extension member. The auxiliary auger is of smaller diameter than the primary auger means and has its inner end positioned radially inwardly of the outer extremity of the primary auger means so that, when the primary and auxiliary auger means are both in use the material from the auxiliary auger feeds directly into the reach of the primary auger means.

Because of the near impossibility of laying a track in the form of a perfect circle, the sweep arm and the carriage are connected by interengaging parts that are relatively movable radially of the silo.

In order that the extension member and the auxiliary conveyor means may be mounted upon the outer end of the sweep arm and the primary auger shaft after the sweep arm and primary auger means have removed the silage from the central area of the silo, leaving the supporting wall of silage adjacent the silo wall, the silo wall is provided with an access opening at floor level, and a closure for the access opening has a core which extends into the silo far enough to just clear the carriage. The silo is originally filled with the core in place, so that there is a void in the silage that provides a tunnel nearly through the wall of silage when the closure and core are removed. There is a very thin layer of material at the inner end of the tunnel which may be manually removed, and thereupon the extension member and auxiliary auger may be easily secured to the sweep arm and the primary auger through the tunnel. A closure having no core, or the original closure with the core removed, is then placed in the access opening to again make the silo airtight at the bottom, and the unloader is operated to cut and remove material from the wall of silage starting from the void or tunnel and progressing circumferentially around the interior of the silo to leave only a thin (two or three inch) wall of material against the silo wall.

The above described mode of operation produces a most effective means of handling silage. The thick wall of silage which is left originally is quite adequate to support the mass of silage in a dome above the unloader; but as the auxiliary auger with its cutters mills away most of this wall the changing stresses in the dome cause chunks of silage to slough out of the dome and fall to the floor for handling by the unloader. The thin wall of silage against the silo wall is no longer able to support the mass, which also slides bodily downward, pushing the thin wall of silage away from the silo wall where it can be reached by the auxiliary auger. Experimental operation of the present structure has shown that there rarely is a sudden massive collapse of the dome; but rather the above described action of sloughing and sliding usually occurs so as to feed silage to the auger and cutters in manageable quantities.

The invention is illustrated in a preferred embodiment in the accompanying drawings in which:

FIG. 1 is a fragmentary plan sectional view of a silo equipped with an unloader and a cored access closure embodying the invention;

FIG. 2 is a fragmentary sectional view of the drive track and carriage taken substantially as indicated along the line 2—2 of FIG. 5;

FIG. 3 is a fragmentary section on an enlarged scale taken substantially as indicated along the line 3—3 of FIG. 2;

FIG. 4 is a fragmentary side elevational view taken substantially as illustrated along the line 4—4 of FIG. 1;

FIG. 5 is a fragmentary plan view, partially in section, which illustrates the structure of the outer end of the sweep arm and primary auger, the carriage, the extension member and the auxiliary auger; and FIG. 6 is a fragmentary section taken substantially as indicated along the line 6—6 of FIG. 5.

Referring to the drawings in greater detail, and referring first to FIG. 1, a silo, indicated generally at 10, has a floor 11, a base 12, and a cylindrical wall 13. An access port 14 is provided with a closure 15 which includes a core portion 16 that extends radially inwardly from the silo wall and has its inner end close adjacent a track, indicated generally at 17, which will be described in more detail hereinafter. The track 17 is mounted on the floor 11 of the silo approximately 16" inwardly from the wall 13.

An unloader, indicated generally at 18, is of the same general construction as that disclosed in Laidig Patent 3,121,501 (Reissue 25,863), and thus will be described in detail only to the extent of stating that it includes a sweep arm 19 and primary conveyor auger means that includes a primary auger 20 which has a shaft 21 that makes a driving connection with a drive unit 22 that includes a motor (not shown) and the illustrated gear box. The sweep arm has an axial end 23 which is mounted for rotation about the axis of the silo, and a free end 24 which terminates adjacent the drive track 17 and is supported upon a carriage, indicated generally at 25. The drive unit 22 rotates the auger 20 so that knives 20a on the auger may cut off silage which is then fed by the auger into the center of the silo where it falls through a central opening 26a in the floor 11 for removal by a conveyor 27a.

Referring now to FIGS. 5 and 6, the sweep arm 19 is seen to include a structural member 26 which has an arcuate front wall 27 and a downwardly and rearwardly inclined wall 28 that has an integral mounting plate 29 at its outer end. A transverse bracket 30 has a mounting portion 31 by means of which it is bolted to the plate 29, and a bearing support portion 32 of the bracket 30 is offset radially inwardly from the plate 29 and carries a hollow bearing 33. The primary auger shaft 21 is tubular and its outer end is closed by a plug 33 in which a removable stub 34 is secured by means of a bolt 35 and nut 35a. The stub 34 extends through the bearing 33 so that latter supports the outer end of the primary auger shaft 21, and a sleeve 36 is secured to the projecting outer end 34a of the stub 34 by means of a pin 37. The primary auger functionally includes a separate auger member 36a on the sleeve 36 which has an outer end portion that extends radially beyond the sleeve and a bracing web 36b connects said auger outer end portion with the sleeve. The auger member 36a has an inner end 36c which is smaller in outside diameter than the primary auger 20, and the outer end 20b of said auger 20 extends outwardly past the bearing bracket portion 32 and overlaps said inner end 36c so the material fed by the separate auger 36a is picked up directly by the primary auger 20.

The connecting means between the sweep arm 19 and the carriage 25 includes an upright shield member that includes a mounting plate 38 and an arcuate shield 38a which extends over the track 17 substantially as a radial extension of the arcuate wall 27. Integral horizontal lugs 39 and 39a overlie a base 40 of the carriage. Integral blocks 41 and 42 on the base 40 support gib plates 43 and 44, respectively, which loosely overlie the lugs 39 and 39a, respectively; and a bearing assembly 45 has integral mounting arms 45a which overlie the gib plates, so that the gib plates and the bearing assembly may be firmly secured to the blocks 41 and 42 by bolts 46.

The bearing assembly 45 supports the outer end of a sweep arm drive shaft 47 which carries a drive sprocket 48 that extends through an opening 49 in the carriage base plate 40 and engages teeth 17a of the track 17. As seen in FIG. 1, the drive shaft 47 is provided at its inner end with a connector 50 which has a square socket in which a square connector plug 51 of an output shaft 52 is slidably received. The output shaft 52 is connected with an electric motor 53 and has its outer end supported in a journal 54. Thus, the motor 53 rotates the sprocket 48 to drive the sweep arm around the axis of the silo.

Referring now particularly to FIGS. 2 and 3, the track 17 is seen to include a cast mounting strip 17b with which the drive teeth 17a are integrally formed, and along the inner faces of the drive teeth 17a is a continuous connecting strip 17c which, together with teeth 17a, overhang the silo floor 11 to provide a recess 17d. The carriage base plate 40 has depending, integral inner and outer skirts 40a and 40b, respectively, which flank the track 17, and from the inner skirt 40a a hold down flange 40c extends beneath the track strip 17c and teeth 17a into the recess 17d, so the carriage is held down by interengagement of the flange 40c and the planar undersides of the teeth 17a and strip 17c.

Referring again to FIGS. 5 and 6, an extension member, indicated generally at 55, includes an arcuate plate 56 which has an attaching flange 57 to receive bolts 58 by which it is secured to a fastening flange 38b on the shield 38a. The arcuate plate 56 has its lower extremity 56a extending beneath an overhanging inclined lip 59 on the carriage 25, and a positioning block 60 which extends rearwardly from the arcuate plate 56 is aligned with the gib plate 44 and spaced only a short distance therefrom so that the plate 44 serves as a rear stop to prevent excessive bending of the extension member 55. The extension member may be removed merely by removing the bolts 58.

It will be observed that the carriage 25 makes a loose, sliding connection with the sweep arm 19, since the two components are held together only by the engagement of the flanges 39 and 39a of the sweep arm beneath the gib plates 43 and 44. When the extension member 55 is in position, it likewise has only a loose, sliding connection with the carriage by reason of the relationship between the lower end portion 56a of the arcuate plate 56 and the overhanging inclined lip 59 at the front of the carriage. Thus, the carriage may move radially with respect to the sweep arm 19 and the extension member 55 to compensate for any deviations of the track 17 from a true circle. Likewise, the sliding connection of the connector member 50 and connector plug 51 compensates for such deviations of the track 17 from a true circle.

Referring still to FIGS. 5 and 6, an auxiliary helical conveyor, indicated generally at 61, includes a shaft 62 and an auger flight 63 which carries knives 63a. As seen in FIG. 5, the inner end of the shaft 62 includes an enlarged integral base 64 provided with guide pins 65 that extend into sockets in the sleeve 36 which is pinned to the outer end of the stub 34, and the shaft 62 is bored to receive a long mounting bolt 66 which extends entirely through the shaft and screws into a threaded hole in the outer end of the stub 34. The auxiliary auger 63 has an inner end 63b which may make a butt fit with the outer end of the separate auger member 36a. Alternatively if the guide pins 65 are omitted and bolts are substituted for the pins, the inner end 36b may overlap the outer end of the separate auger 36a.

In addition to the advantage of being able to start operation of the unloader with the extension member 55 and auxiliary auger 61 removed, the present structure affords the advantage that the auxiliary auger is of smaller diameter and thus cuts more efficiently through the hard packed silage adjacent the wall than could the larger diameter auger 20. Efficient cutting is also promoted by tapering the auxiliary auger 61 toward its outer end as is clearly apparent in FIG. 5. Likewise, augers of different sizes and pitches, and augers having different blades, afford varying degrees of efficiency of operation in different types of material such as grass, corn and haylage. Thus, the auxiliary auger 61 may be changed depending upon the material in the silo; and since this may be done from outside the silo, the change may be made with no risk to the person even when there is material in the silo.

In operation, the silo is first filled with the extension member 55 and auxiliary auger 61 removed, and with the closure 15 and core 16 in place as seen in FIG. 1. The unloader is then operated for a few revolutions to cut out and remove the silage from an area which extends from a line slightly outside the outer edge of the track 17 to the central opening 11a. The closure 15 with the integral core 16 is then removed so that there is a void, or tunnel, in the silage which extends almost into the central area which has been cut out by operation of the unloader. The small remaining amount of material at the inner end of the void or tunnel may be manually removed and the unloader is then operated to move the sweep arm until its free end is directly opposite the tunnel. The extension member 55 and the auxiliary auger 61 may then be mounted upon the sweep arm and the primary auger shaft, respectively, so that subsequent rotation of the sweep arm about the axis of the silo will cause the auxiliary auger 61 and the knives 63a to cut and remove the silage from the wall which has been left by operation of the sweep arm without said auxiliary auger. Before this further operation of the unloader however, the closure 15 with the core 16 detached therefrom, or a separate closure (not shown) which does not project inwardly beyond the silo wall, is placed in the opening 14 to effect substantial sealing of the silo.

As seen in FIGS. 2 and 6, the inclined flange 59 at the front of the carriage base 40 barely clears the tops of the track teeth 17a, and thus acts as a track clearing wedge member, or plow, up which material on the track slides until it is picked up by the separate auger member 36a. Material not scraped off the track is caused to drop through the holes between the teeth 17a where the flange 40c pushes it along the recess 17d beneath the track and toward the center of the silo where it may be picked up by the sweep arm and primary auger 20. Either with or without the auxiliary auger 62 and extension member 56, the carriage 25, and especially the wedge-like flange 59 and hold-down flange 40c, clear material from the track.

In addition to the improved cutting efficiency afforded by the tapered auxiliary auger, that auger shape also promotes the downward movement of silage near the silo wall by tapering the periphery of the dome of silage.

The forgeoing detailed description has been given for clearness of understanding only, and no unnecessary limitations should be understood therefrom, for some modifications will be obvious to those skilled in the art.

I claim:

1. In a bottom unloader for a silo having a floor with a central opening and a cylindrical wall, in combination: radial sweep arm means including a frame having an axial end supported for rotation on the vertical axis of the silo and a free end spaced from the silo wall; carriage means supporting the free end of the arm means on the floor, said carriage means including toothed drive means; drive track means on the floor on which the drive means rides, said track means having teeth engaged by the toothed drive means and being generally concentric with the wall; means for driving said drive means to rotate the sweep arm about the silo; primary conveyor means on the sweep arm means to move material from adjacent the track means into the central opening in the door; means on the carriage means for displacing material from the drive track means into the primary conveyor means; auxiliary conveyor means positioned radially outward with respect to the primary conveyor means to move material from the space between the wall and the track means into the area traversed by the primary conveyor means; and means for driving said primary and said auxiliary conveyor means.

2. In a bottom unloader for a silo having a floor with a central opening and a cylindrical wall, in combination: radial sweep arm means including a frame having an axial end supported for rotation on the vertical axis of the silo and a free end spaced from the silo wall; carriage means supporting the free end of the arm means on the floor, said carriage means including drive means; cooperating members on the sweep arm frame and on the carriage that permit relative radial movement between the frame and the carriage; track means on the floor on which the drive means rides, said track means being generally concentric with the wall; means for driving said drive means to rotate the sweep arm about the silo; primary conveyor means on the sweep arm means to move material from adjacent the track means into the central opening in the floor; auxiliary conveyor means positioned radially outward with respect to the primary conveyor means to move material from the space between the wall and the track means into the area traversed by the primary conveyor means; means for driving said primary and said auxiliary conveyor means.

3. The combination of claim 2 in which the members on the carriage slide relative to the cooperative members on the frame.

4. The combination of claim 1 which includes an extension member detachably secured to the outer end of the sweep arm and extending in spaced relationship to the rear of the auxiliary conveyor means.

5. The combination of claim 4 which includes means detachably securing the auxiliary conveyor means to the outer end of the primary conveyor means.

6. In a bottom unloader for a silo having a floor with a central opening and a cylindrical wall, in combination: radial sweep arm means including a frame having an axial end supported for rotation on the vertical axis of the silo and a free end spaced from the silo wall; carriage means supporting the free end of the arm means on the floor, said carriage means including drive means; track means on the floor on which the drive means rides, said track means being generally concentric with the wall; means for driving said drive means to rotate the sweep arm about the silo; primary conveyor auger means having a radial shaft and an open outer end, said auger being arranged to move material from adjacent the track means into the central opening in the floor; auxiliary conveyor auger means having a shaft coaxial with that of the primary conveyor means and having an open inner end, said auxiliary conveyor means being positioned radially outward with respect to the primary conveyor means to move material from the space between the wall and the track means into the area traversed by the primary conveyor means; and means for driving said primary and said auxiliary conveyor means.

7. The combination of claim 6 which includes an extension member providing an arcuate shield behind the auxiliary auger, first attaching means detachably connecting the extension member to the free end of the sweep arm means, and second attaching means detachably connecting the auxiliary conveyor shaft to the outer end of the primary conveyor shaft.

8. The combination of claim 6 which includes attaching means that extends longitudinally through the auxiliary conveyor shaft and connects with the free end of the primary conveyor shaft, and aligning pins on the auxiliary conveyor shaft which extend into sockets in said primary conveyor shaft.

9. The combination of claim 6 in which the sweep arm frame includes an arcuate frame wall which is behind and in spaced relationship to the primary conveyor auger, and which includes an extension member providing an arcuate shield which is generally aligned with said arcuate frame wall.

10. The combination of claim 6 in which a bracket is secured to the free end of the sweep arm and has an offset portion that is spaced radially inwardly from the plane of said free end, a hollow bearing member is mounted in said offset portion, a short connecting shaft is journaled in said bearing member and extends radially in both directions therefrom, the outer end of the primary conveyor shaft is fixed to one end of the connecting shaft, and the inner end of the auxiliary conveyor shaft is fixed to the other end of the connecting shaft.

11. The combination of claim 10 in which the open outer end of the primary conveyor auger overlaps the offset portion of the bracket and also overlaps the open inner end of the auxiliary conveyor auger.

12. The combination of claim 11 in which the auxiliary conveyor auger is of smaller diameter than the primary conveyor auger.

13. The combination of claim 6 in which the open outer end of the primary conveyor auger overlaps the open inner end of the auxiliary conveyor auger.

14. The combination of claim 13 in which the auxiliary conveyor auger is of smaller diameter than the primary conveyor auger.

15. The combination of claim 6 in which the auxiliary conveyor auger is tapered toward its outer end.

16. In a bottom unloader for a silo having a floor with a central opening and a cylindrical wall, in combination: radial sweep arm means including a frame having an axial end supported for rotation on the vertical axis of the silo and a free end spaced from the silo wall; carriage means supporting the free end of the arm means on the floor, said carriage means including drive means; track means on the floor on which the drive means rides, said track means being generally concentric with the wall, there being a flange on said track means spaced slightly above the floor, and a flange on the sweep arm means between the floor and the track flange; means for driving said drive means to rotate the sweep arm about the silo; primary conveyor means on the sweep arm means to move material from adjacent the track means into the central opening in the floor; auxiliary conveyor means positioned radially outward with respect to the primary conveyor means to move material from the space between the wall and the track means into the area traversed by the primary conveyor means; and means for driving said primary and said auxiliary conveyor means.

17. The combination of claim 16 in which the track means includes a rack-like upper surface and the drive means is a wheel that has teeth engaging said rack-like surface.

18. In a bottom unloader for a silo having a floor with a central opening and a cylindrical wall, in combination: radial sweep arm means including a frame having an axial end supported for rotation on the vertical axis of the silo and a free end spaced from the silo wall; carriage means supporting the free end of the arm means on the floor, said carriage means including drive means; track means on the floor on which the drive means rides, said track means being generally concentric with the wall; means for driving said drive means to rotate the sweep arm about the silo; primary conveyor means on the sweep arm means to move material from adjacent the track means into the central opening in the floor; auxiliary conveyor means positioned radially outward with respect to the primary conveyor means to move material from the space between the wall and the track means into the area traversed by the primary conveyor means detachably securing said auxiliary conveyor means to the free end of the primary conveyor means; means for driving said primary and said auxiliary conveyor means; a removable door in the silo wall at floor level, said door having a plug portion which extends inwardly to a line which is immediately outside the path traversed by the end of the sweep arm means so that removal of the door leaves a tunnel in material in the silo substantially to the free end of the sweep arm means leaving only a thin layer of material which may be manually removed to expose the free end of the sweep arm means, the attaching means for the auxiliary conveyor means being manipulatable from the outer end of the auxiliary conveyor means so that said auxiliary conveyor means may be connected to the primary conveyor means in said tunnel.

19. The combination of claim 6 in which the auger of the auxiliary conveyor tapers toward the silo wall.

20. In a bottom unloader for a silo having a floor with a central opening and a cylindrical wall, in combination: radial sweep arm means including a frame having an axial end supported for rotation on the vertical axis of the silo and a free end spaced from the silo wall, carriage means supporting the free end of the sweep arm means on the floor, and a primary conveyor auger extending the length of the arm, said primary auger having an open outer end; an extension member on the free end of the arm and extending outwardly from the carriage means, said extension member terminating immediately adjacent the silo wall; an auxiliary conveyor auger associated with the extension member, said auxiliary auger being coaxial with the primary auger and having an open inner end which is overlapped by the open outer end of said primary auger so the auxiliary auger may move material from adjacent the wall into the primary auger; means for rotating said sweep arm; and means for driving said primary auger and said auxiliary auger.

21. A method of handling silage in a silo having a floor, a wall provided with an access opening extending upwardly from floor level, a closure for said opening, and a rotating silo unloader accessible through said opening, said method comprising the steps of:
coring a portion of the silo which extends a short distance inwardly from said opening and which extends upwardly from floor level approximately to the top of the unloader;
filling the silo with silage while leaving said portion of the silo cored so there is a void in the silage in the portion so cored;
cutting and removing the silage from the central area of the silo immediately above the floor while leaving a relatively shallow wall of material adjacent the silo wall which is broken only by said core;
removing the closure and uncoring said portion of the silo through the access opening and replacing the closure; and
cutting and removing the material from said wall of material starting from said void and progressing circumferentially around the interior of the silo.

22. In a bottom unloader for a silo having a floor with a central opening and a cylindrical wall, in combination: radial sweep arm means including a frame having an axial end supported for rotation on the vertical axis of the silo and a free end spaced from the silo wall; carriage means supporting the free end of the arm means on the floor, said carriage means including drive means; track means on the floor on which the drive means rides, said track means being generally concentric with the wall;

means for driving said means to rotate the sweep arm about the silo; primary cutter and conveyor means on the sweep arm means to move material from adjacent the track means into the central opening in the floor; separate auxiliary cutter and conveyor means positioned radially outward with respect to the primary conveyor means to cut material in the space between the wall and the track means and move said material into the area traversed by the primary conveyor means, said auxiliary cutter and conveyor means having cutting and conveying characteristics which differ from those of the primary cutter and conveyor means; and means for driving said primary and said auxiliary cutter and conveyor means.

References Cited

UNITED STATES PATENTS

| | | | |
|---|---|---|---|
| 1,275,558 | 8/1918 | Holmgreen | 214—17 |
| 2,718,970 | 9/1955 | Dueringer | 214—17 |
| 2,736,461 | 2/1956 | Dueringer et al. | 214—17 X |
| 2,914,198 | 11/1959 | Hein | 214—17 |
| 3,024,923 | 3/1963 | Osborne | 214—17 |
| Re. 25,863 | 9/1965 | Laidig | 214—17 |

ROBERT G. SHERIDAN, *Primary Examiner.*